United States Patent
Kelly et al.

(10) Patent No.: US 9,644,764 B2
(45) Date of Patent: May 9, 2017

(54) OFFSHORE FLUID TRANSFER SYSTEM AND METHOD

(75) Inventors: Orla Ann Kelly, Sena (FR); Olivier Diana, Thorigny sur Oreuse (FR); Renaud Le Devehat, Fleurigny (FR)

(73) Assignee: FMC Technologies S.A., Sens (FR)

( * ) Notice: Subject to any disclaimer, the term of this patent is extended or adjusted under 35 U.S.C. 154(b) by 74 days.

(21) Appl. No.: 14/111,528

(22) PCT Filed: Apr. 10, 2012

(86) PCT No.: PCT/IB2012/051743
§ 371 (c)(1),
(2), (4) Date: Oct. 11, 2013

(87) PCT Pub. No.: WO2012/140566
PCT Pub. Date: Oct. 18, 2012

(65) Prior Publication Data
US 2014/0034137 A1 Feb. 6, 2014

(30) Foreign Application Priority Data
Apr. 11, 2011 (FR) .................................. 11 53138

(51) Int. Cl.
*F16L 3/16* (2006.01)
*B63B 27/24* (2006.01)
*B67D 9/02* (2010.01)

(52) U.S. Cl.
CPC ................. *F16L 3/16* (2013.01); *B63B 27/24* (2013.01); *B67D 9/02* (2013.01); *Y10T 137/0318* (2015.04); *Y10T 137/6966* (2015.04)

(58) Field of Classification Search
CPC .... F16L 3/16; B67D 9/02; B67D 9/00; B67D 7/002; B63B 27/24; B63B 27/34; Y10T 137/6966; Y10T 137/8807; Y10T 137/88078; Y10T 137/88094
USPC .............................. 137/356, 614, 616.5, 616
See application file for complete search history.

(56) References Cited

U.S. PATENT DOCUMENTS

| 1,680,831 | A | | 8/1928 | White | |
|---|---|---|---|---|---|
| 3,032,082 | A | * | 5/1962 | Vilain | B67D 9/02 137/615 |
| 3,085,593 | A | | 4/1963 | Sorensen | |
| 3,217,748 | A | * | 11/1965 | Harper | 137/615 |
| 3,249,121 | A | | 5/1966 | Bily | |

(Continued)

FOREIGN PATENT DOCUMENTS

| EP | 0 947 464 A1 | 10/1999 |
|---|---|---|
| SU | 553162 | 3/1977 |

(Continued)

*Primary Examiner* — Michael R Reid

(57) ABSTRACT

An offshore fluid transfer system comprising a boom (2100) and at least one movable fluid conveying pipe (3000) attached to the boom, said movable pipe (3000) comprising, starting from its anchorage point, a length for extension, then an outer valve (3210) for coupling to a third party loading pipe, a maneuvering cable called outer maneuvering cable (4100) maneuvered from the boom (2100) being furthermore linked to the free end of the movable pipe at a point referred to as cable anchorage point, characterized in that the anchorage point is rigidly connected to the outer valve (3210). The invention also relates to the corresponding method.

12 Claims, 15 Drawing Sheets

(56) References Cited

U.S. PATENT DOCUMENTS

| | | | |
|---|---|---|---|
| 3,773,093 A * | 11/1973 | Eustace | B63B 27/24 137/236.1 |
| 4,190,090 A | 2/1980 | Tuson | |
| 4,206,782 A | 6/1980 | Tuson | |
| 4,261,398 A | 4/1981 | Haley | |
| 4,408,943 A | 10/1983 | McTamaney et al. | |
| 4,989,903 A * | 2/1991 | McAllister | F16L 3/01 285/114 |
| 4,998,560 A * | 3/1991 | Le Devehat | 137/615 |
| 6,343,620 B1 | 2/2002 | Le Devehat et al. | |
| 6,434,948 B1 | 8/2002 | Eide et al. | |
| 6,637,479 B1 | 10/2003 | Eide et al. | |
| 6,886,611 B2 | 5/2005 | DuPont et al. | |
| 6,938,643 B2 | 9/2005 | Pollack | |
| 7,007,623 B2 | 3/2006 | Boatman et al. | |
| 7,147,022 B2 | 12/2006 | Le Devehat | |
| 2004/0154697 A1 | 8/2004 | Dupont et al. | |
| 2007/0289517 A1 | 12/2007 | Poldervaart et al. | |
| 2009/0065078 A1 | 3/2009 | Le Devehat | |
| 2010/0147398 A1 * | 6/2010 | Thomas et al. | 137/315.01 |
| 2011/0232469 A1 | 9/2011 | Deleignies | |

FOREIGN PATENT DOCUMENTS

| | | |
|---|---|---|
| WO | WO 99/35031 A1 | 7/1999 |
| WO | WO 2007/113203 A1 | 10/2007 |
| WO | WO 2010/086749 A1 | 8/2010 |
| WO | WO 2010/137990 A1 | 12/2010 |

* cited by examiner

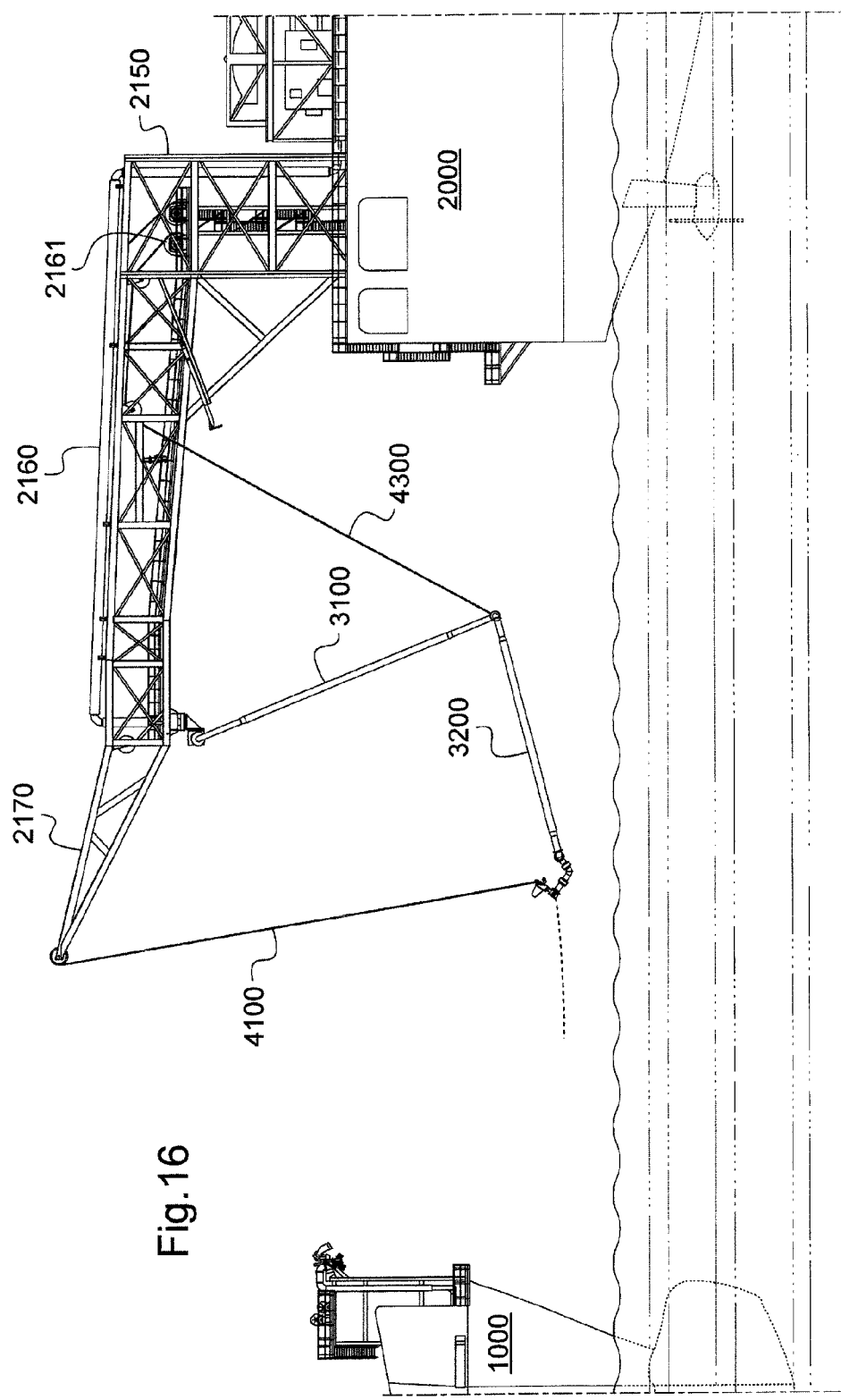

OFFSHORE FLUID TRANSFER SYSTEM AND METHOD

BACKGROUND OF THE INVENTION

The invention relates to an off-shore fluid transfer system and to an associated transfer method. The fluid may be liquefied natural gas for example and the transfer may be made between two ships on the open sea.

The first of the two ships may be a production ship known by the name LNGP (for "Liquefied Natural Gas Producer"), LNG-FPSO (for "Liquefied Natural Gas Floating Production Storage and Offloading") or FLNG (for "Floating Liquid Natural Gas Unit"), a reliquefaction ship (FSRU for "Floating Storage and Regasification Unit"), a GBS (for "Gravity Base Structure") or lastly a platform.

The second of the two ships may be a ship adapted to receive the gas for its transport, such as a tanker or an LNG-C (for "Liquefied Natural Gas Carrier", for example a methane tanker).

Systems are known with rigid piping articulated to two successive arms and other flexible piping systems such as cryogenic hoses. One of the two structures, often the FLNG, possesses such movable piping extending over several meters outside the perimeter of its hull, a few meters above the level of the sea, and being adapted to be connected to ducts fixed to the second structure, within the perimeter of the hull thereof, in vertical alignment with the hull, or at a slight horizontal distance therefrom. Thanks to the flexibility in three dimensions given either by the two articulations controlling the arms, or by the flexible character of the piping, the transfer of fluid may be carried out successfully on a rough sea.

Systems are known, for example from the document EP0947464, using a coupling in which the movable piping, which is articulated, comprises a fastening flange which, disposed vertically, couples by a descending movement with a connector of the second structure which is open upwardly. A complex system of counterweights or cables raised from a support structure ensures, in case of disconnection, by leverage, the spontaneous rotation upwardly of the distal part of the articulated piping around an articulation disposed at mid-length of the piping, so as to avoid striking between that distal part and the second structure. During the connection, an additional cable provides for the positioning of the fastening flange relative to the connector of the second structure. This cable is fastened to the movable piping before a final assembly of swivel joints or rotations, which results in the opening of the piping being spontaneously oriented downwards, due to gravity. The connection is complicated by this configuration, since the approach of the fastening flange in the presence of motion due to the waves is delicate.

By contrast, patent application FR 2 941 434 describes a transfer system using, for the connection of the articulated tube that comes from the first ship to the piping of the second ship, an acquisition cable (also called LNGC cable or methane tanker cable) fastened to the free end of the tube and maneuvered by a winch disposed on the second ship. This solution enables the coupling of the ducts to be carried out by a movement of the free end of the articulated tube having a rising main component, the free end then being received by a connector on the second ship the opening of which is substantially downwardly directed. Such a solution enables shocks during the connection to be avoided simply, and to establish a coupling requiring no guidance other than that given by the acquisition cable.

Nevertheless, despite the solutions proposed until now, certain situations may still be difficult to manage during maneuvers. In particular, in a situation of emergency disconnection, it is desired to avoid plunging of the free end of the movable piping into the water. Furthermore, given the fast rates necessitated by the use of the structures, it is desired to enable the two ships to connect their ducting rapidly, and to move apart from each other as fast as possible after the disconnection, whatever the circumstances thereof.

SUMMARY OF THE INVENTION

The present invention thus relates to a system and a method enabling fluid transfer to be carried out even more simply, quickly and safely, by simplifying in particular the steps of connecting and disconnecting the piping of the two ships.

To that end there is provided an offshore fluid transfer system comprising a boom and at least one movable fluid conveying pipe attached to a point on the boom, said movable pipe comprising, starting from its anchorage point, a length for extension, then, at its free end, an outer valve for coupling to a third party loading pipe, a maneuvering cable called outer maneuvering cable maneuvered from the boom being furthermore linked to the free end of the movable pipe at a point referred to as anchorage point, characterized in that the anchorage point is rigidly connected (with no degree of freedom) to the outer valve.

Thanks to this device, it is possible to extend the movable conveying pipe prior to any connection with a third party floating unit, while having the advantage, once that unit is present, of a fast connection by means for coupling by rising movement, such as those referred to in FR 2 941 434.

Furthermore, it is possible, during disconnection, to have the advantage of a fast and simplified disconnection by the coupling means. This disconnection is then carried out by decoupling by descending movement. It is followed by an action of removing the links with the third party floating unit, which may therefore go away, before retracting the movable conveying pipe.

Lastly, in all the configurations and in all the sequences, including in case of emergency disconnection, the touching of the water by the free end of the movable pipe may be avoided by virtue of the outer maneuvering cable installed between the free end of the movable pipe and a point on the boom.

In an embodiment, on the movable pipe, on the approach to the free end, there has been disposed a set of swivel joints disposed such that the set of swivel joints is included between the length for extension and the anchorage point. The swivel joints are in particular necessary to enable the system to tolerate the movements imposed by the outer environment (waves, wind, current, etc.). In addition, however, the fact that the outer maneuvering cable is positioned after the last swivel joint enables the opening of the outer valve to be maneuvered upwardly, contrary to what is presented in EP0947464.

According to an advantageous feature, there is provided a safety device configured to maintain a constant unwound length of the outer maneuvering cable in case of emergency disconnection between the movable pipe and the third party loading pipe.

According to one embodiment, the movable pipe is constituted by at least two successive articulated arms. Alternatively, it is constituted by at least one flexible pipe.

According to particular features, the means for coupling by rising movement comprises at least one centering cone, male or female, and/or an anchorage point for an acquisition cable. The anchorage point may be on a transverse holding structure joining at least two movable fluid conveying pipes parallel to each other in the vicinity of their free end.

There is also provided a method for offshore fluid transfer by at least one movable fluid conveying pipe attached to a boom and comprising, starting from its anchorage point, a length for extension then an outer valve for coupling to a third party loading pipe, the general maneuver for coupling or for decoupling comprising a step of extending, or respectively of retracting, the movable pipe using an outer maneuvering cable maneuvered from the boom and linked to the movable pipe at a point referred to as anchorage point, characterized in that the anchorage point is rigidly connected (with no degree of freedom) to the outer valve.

Thanks to this method, it is possible to extend the movable conveying pipe prior to any connection with a third party floating unit, which may then approach even though the pipe is already extended, while having the advantage, once the third party floating unit is present, of a fast connection by means for coupling by a rising movement, such as those presented in FR 2 941 434.

Furthermore, it is possible, during disconnection, to have the advantage of a fast and simplified disconnection by the coupling means. This disconnection is then carried out by decoupling by descending movement. It is followed by an action of removing the links with the third party floating unit before retracting the movable conveying pipe.

According to a feature of implementation, the step of extending, or respectively of retracting, is carried out with the use of a second maneuvering cable, referred to as inner maneuvering cable, linking an intermediate point of the movable pipe to the boom. By virtue of this feature, the tension in the outer maneuvering cable is reduced relative to the prior art.

According to an advantageous feature, the coupling or uncoupling is carried out by maneuvering the free end also using an acquisition cable linking said free end to a point on a third party floating unit.

According to a feature of implementation, the coupling or the uncoupling is carried out in at least two steps, the outer maneuvering cable being wound or unwound during at least one step and the acquisition cable being wound or unwound during at least the other step.

According to a feature of implementation, a safety cable links a point on the third party floating unit and a structure fastened to the free end of the movable pipe during the fluid transfer, said safety cable being configured to unwind at a speed lower than a maximum speed of safety in case of emergency disconnection. This feature makes it possible to widen the perimeter of the conditions for use of the system in complete safety, the movable pipe being progressively released by the third party floating unit during the emergency disconnection process.

The structure fastened to the free end of the movable pipe during the transfer of the fluid is for example a lower valve of a valve-coupler of the third party loading pipe, said valve-coupler comprising a lower valve and an upper valve separated by an emergency decoupling system.

According to a feature of implementation, the coupling or the decoupling is carried out in at least two steps, centering cones entering into contact and into abutment during a first step, and a coupler, for example a hydraulic and/or automatic coupler, engaging a connection such that the fastening flanges are in contact and are centered, during a second step.

Other features and advantages of the invention will appear in the light of the following description, which is non-limiting and made with reference to the accompanying drawings.

BRIEF DESCRIPTION OF THE DRAWINGS

FIGS. 13 to 16 present different successive steps of a method of emergency disconnection of the piping of the two ships using a transfer system according to the invention.

DETAILED DESCRIPTION OF THE INVENTION

Figure 1:
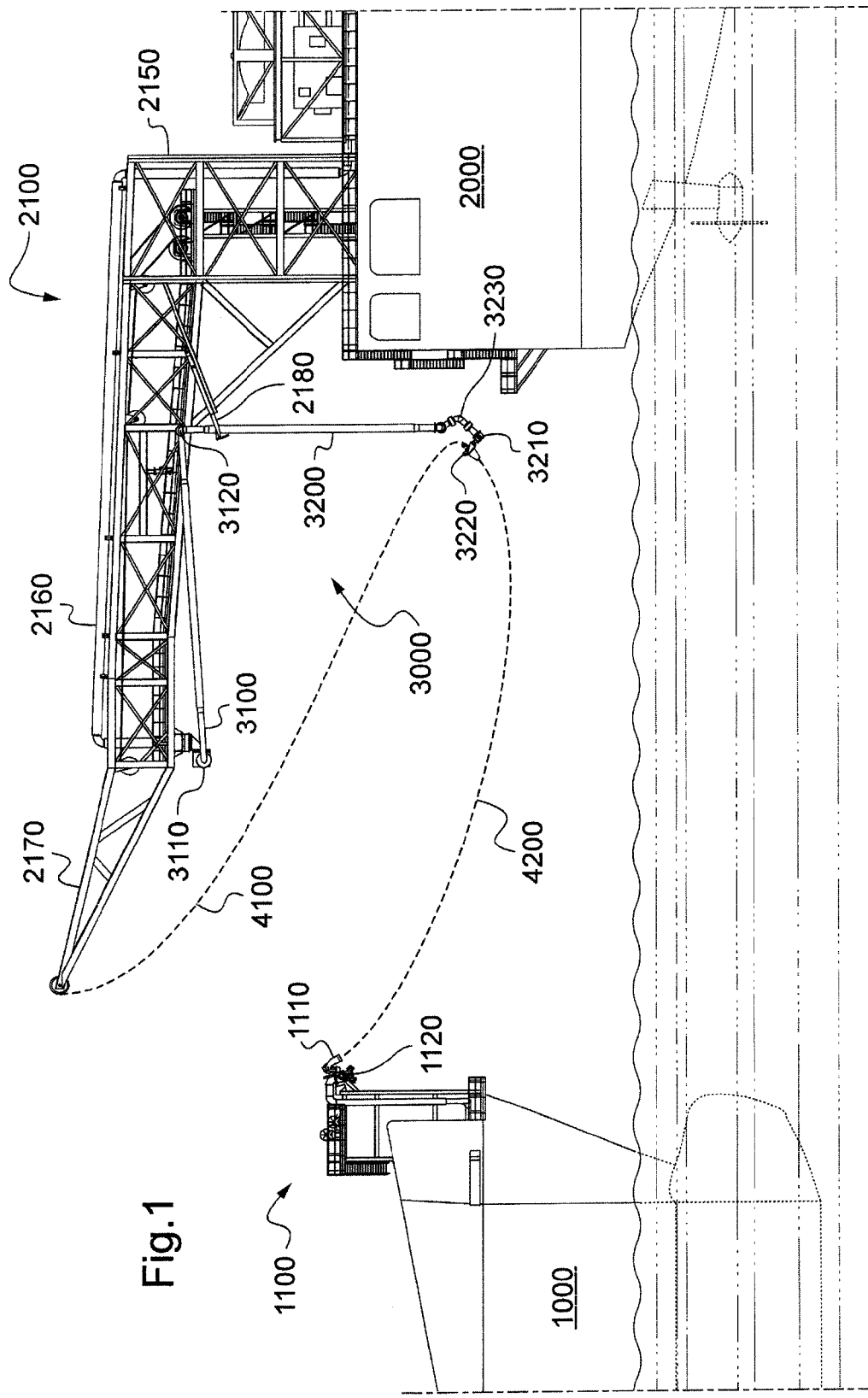
FIGS. 1 to 5 present different successive steps of a method of connecting the piping of the two ships using the transfer system according to the invention.

In FIG. 1, a methane tanker 1000 has been represented close to a production ship 2000. A support structure 2100 is fastened to the production ship 2000. This support structure 2100 is essentially constituted by metal beams and it comprises a first rising segment 2150 fastened to the ship followed by a second horizontal segment 2160. The assembly of the two segments constitutes a boom which extends outside the area of the production ship 2000 above the water, and whose rising segment constitutes the leg. Furthermore, the horizontal segment is extended by a pointed segment 2170 culminating at a slightly greater height than that of the horizontal segment at the distance of several meters from the hull of the production ship 2000. As the drawing constitutes a side view, there may in reality be several of the members represented singly, disposed in line with each other perpendicularly to the plane of the view.

An articulated tube 3000 is fastened to the support structure 2100 at the junction between the horizontal segment 2160 and the pointed segment 2170 on the lower part of the support structure 2100. Although the articulated tube 3000 is single in the view of the drawing, several tubes may be used, in particular three tubes, disposed in line with each other perpendicularly to the plane of the view.

The articulated tube 3000 is composed of two successive segments, the first being a proximal segment 3100 and the second a distal segment 3200. The first end of the proximal segment 3100 is articulated to the horizontal segment 2160 by a series 3110 of three double swivel joints known as "rotations". Such a combination of rotations enables movements of the structure in three planes (movements of "sway", "surge" and "heave"). Each of these rotations is double, and comprises both a product rotation and a mechanical rotation.

In the vicinity of the junction between the proximal and distal segments 3100 and 3200, the articulated tube is retained in the position of FIG. 1 by a locking system 2180 holding the distal structure 3200 of the articulated tube 3000 to the horizontal segment 2160 of the support structure 2100. This locking system 2180 is completed by a system which holds the proximal segment 3100 in place in the boom 2100.

The proximal and distal segments 3100 and 3200 are linked together by a single rotation 3120 similar to those already referred to. Lastly, at the free end of the distal segment 3200, a series 3230 of three rotations connects the distal segment 3200 to an outer valve 3210 fastened to a male centering cone 3220.

The articulated tube 3000 constitutes a movable pipe for conveying fluid. Its point of fastening to the boom is offset by several meters horizontally relative to the leg thereof, to a point overhanging the sea.

As mentioned above, as FIG. 1 is a side view, only one articulated tube 3000 is represented, but the invention may be implemented with several articulated tubes offset from each other perpendicularly to the plane of the Figure, or otherwise disposed. The invention may also be implemented with one or more external cables, the number of which may or may not be equal to the number of lines of articulated tubes. The invention may also be implemented with one or more outer cables, and one or more acquisition cables. The fact of having several lines or several cables may be advantageous to enable sharing of the loads applied to the different members, to ensure their redundancy or to balance the lines.

At its edge the methane tanker 1000 comprises a support structure 1100 presenting towards the sea a downwardly oriented female centering cone 1110 with its opening centered on an axis forming an angle with the vertical. In the vicinity of that cone 1110 there is a valve-coupler 1120, oriented parallel to the cone 1110.

In FIG. 1, an outer cable 4100 has been represented, linking the end of the pointed segment 2170 to the centering cone 3220. This outer cable 4100 is presented here in dashes indicating that it is held with a minimum constant tension so as to avoid it slackening. A so-called acquisition cable 4200 of the methane tanker 1000 has also been represented which links the support structure 1100 of the methane tanker 1000 to the centering cone 3220.

The acquisition cable 4200 was put into place in advance using a light messenger cable and a winch. This is also the case for the outer cable 4100. The outer cable 4100 is a maneuvering cable the object of which is the maneuvering of the free end of the distal segment 3200 during operations of connection and disconnection.

Figure 2:
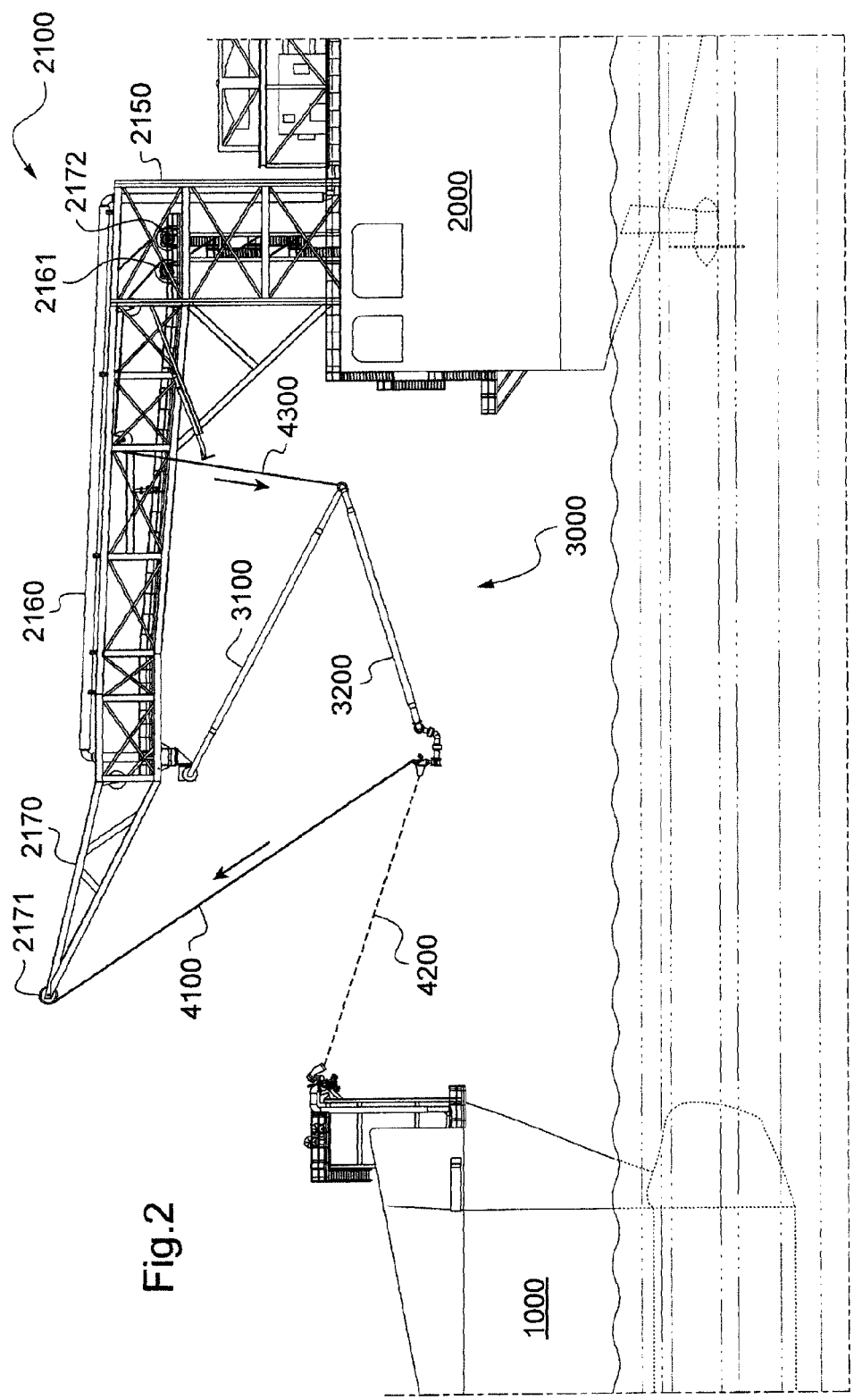

In FIG. 2, the start of the process of connecting the articulated tube 3000 to the ducts of the methane tanker 1000 has been represented.

The locking system 2180 having been disengaged, the movement and the position of the articulated tube 3000 are controlled by the outer cable 4100 which is progressively wound via a pulley 2171 present at the end of the pointed segment 2170 by a winch 2172 placed at the rear of the boom 2100 in the leg 2150 of the boom and are also controlled by an inner cable 4300 linking a point of the proximal segment 3100 in the vicinity of the junction between the proximal and distal segments 3100 and 3200 and a point in the vicinity of the middle of the horizontal segment 2160 of the support structure 2100. This inner cable 4300 is maneuvered by a winch 2161. Both cables 4100 and 4300 are presented in FIG. 2 in continuous line indicating a cable under tension undergoing controlled winding or unwinding. By contrast, the acquisition cable 4200 is, as in FIG. 1, still manipulated under minimum constant tension the object of which is not the movement or control of the articulated tube 3000.

Figure 3:
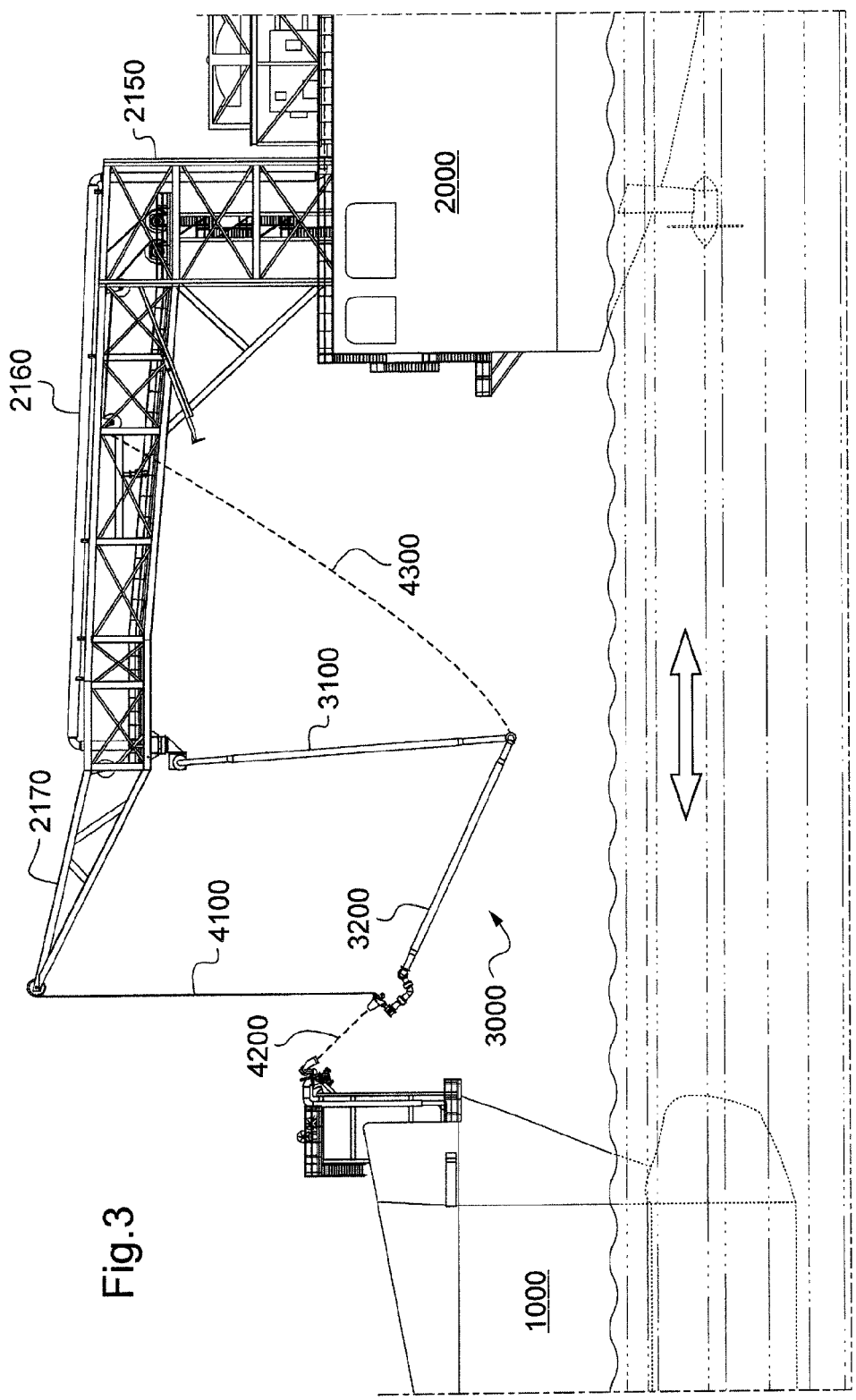
Figure 4:
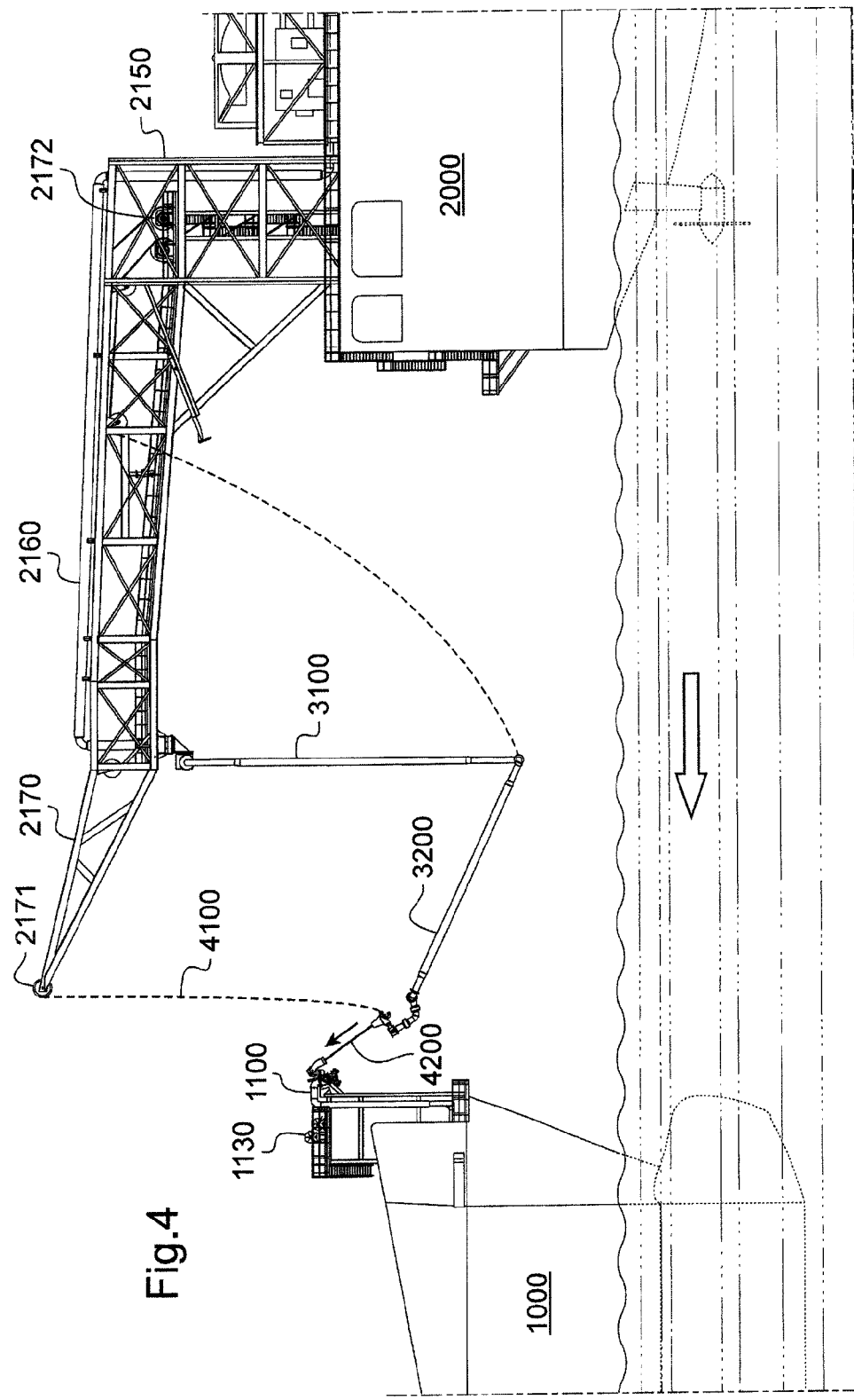

During the movement presented in FIG. 2, rotation is imparted to the proximal segment 3100 about its point of attachment to the support structure 2100 which progressively brings it from a substantially horizontal disposition to a vertical disposition represented in FIG. 3. The distal segment 3200 which, initially, was disposed at approximately 90° to the proximal segment 3100, comes closer thereto until an angle of approximately 60° is formed with the proximal segment 3100.

Because the movement continues, the position represented in FIG. 3 is attained. The cable 4300 is then slackened such that only a minimum constant tension is applied to it. The position of FIG. 3 is qualified as equilibrium position since in that position the change of tension in the cable 4300 has no effect on the position of the two parts of the articulated tube 3000. In that position, the outer cable 4100 is substantially vertical.

At this stage, a winch 1130 of the support structure 1100 of the methane tanker 1000 is activated so as to wind the acquisition cable 4200. A few moments later, the winding winch 2172 controlling the outer cable 4100 turning round the pulley 2171 is deactivated and only a minimum constant tension is then applied to the outer cable 4100. Because the movement continues, the male cone 3220 engages in the female cone 1110 and the outer valve 3210 connects to the lower valve of the valve-coupler 1120. The winch 1130 is then deactivated, or the acquisition cable 4200 is disconnected and the acquisition cable sheaths are disconnected using hydraulic pincers enabling the sheaths to be freed in case of emergency. Physically, the sheaths crimped on the cables remain in their housing but are no longer locked.

After the connection, only a minimum constant tension is applied to the outer cable 4100 and the inner cable 4300.

Figure 5:
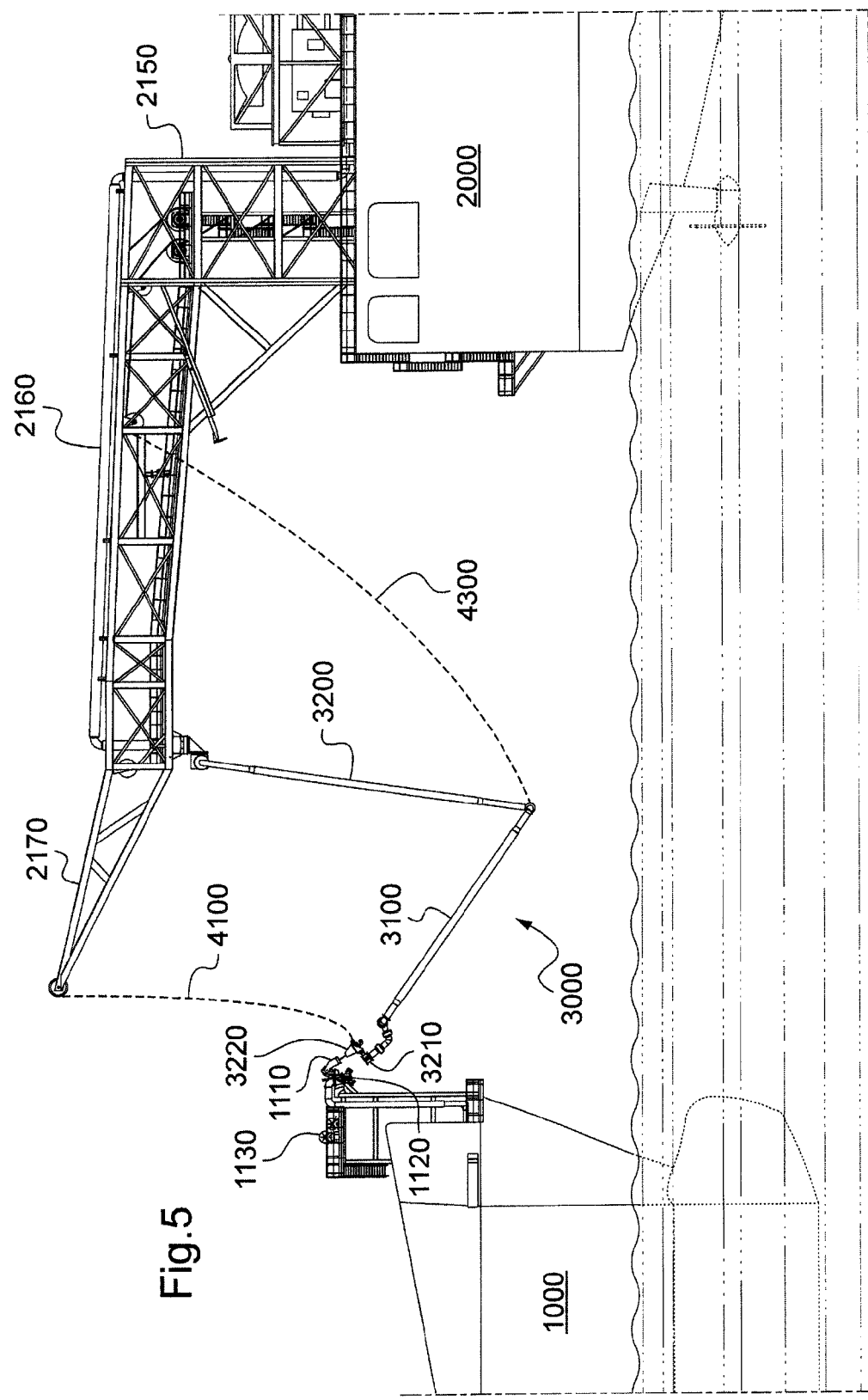
Figure 6:
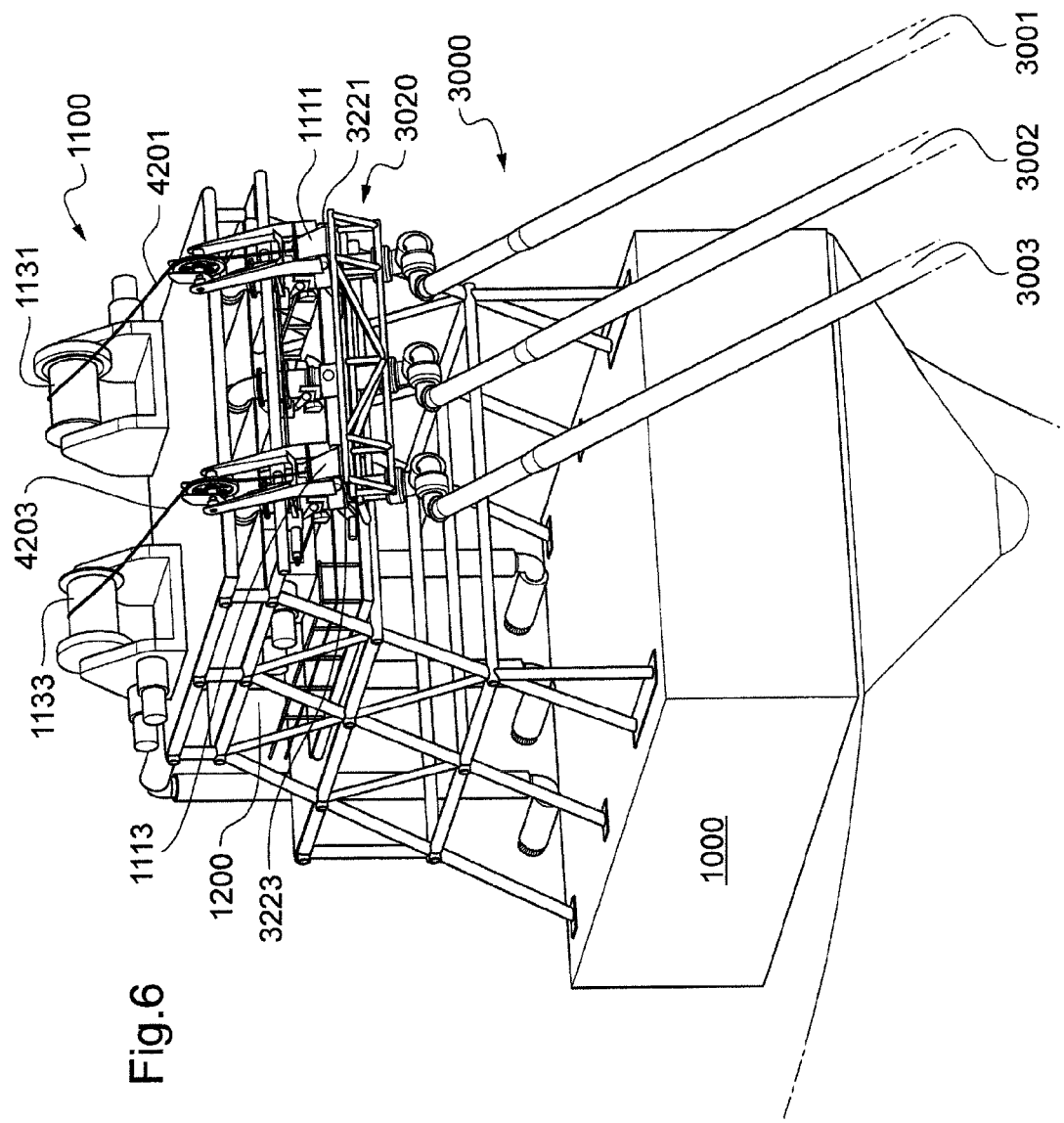
FIG. 6 presents a three quarters view of the connection members of the piping of the two ships.

In FIG. 6, the junction between the ducts coming from the production ship 2000 and the ducts from the methane tanker 1000 in the position of FIG. 5 is shown.

This three quarters view shows the presence of three articulated tubes of the same kind as articulated tube 3000 presented in the preceding Figures, parallel to each other, as well as two acquisition cables, of the same kind as the acquisition cable 4200 presented in the preceding Figures, also parallel to each other. The articulated tubes respectively bear the references 3001, 3002 and 3003, and the acquisition cables respectively bear the references 4201 and 4203.

The articulated tubes 3001, 3002 and 3003 are joined to each other by a transverse holding structure 3020. Two male centering cones 3221 and 3223 are fastened upwardly on that transverse holding structure 3020. Two female centering cones 1111 and 1113 of the same kind as the female centering cone 1110 are fastened downwardly on the on the support structure 1100. The male centering cones 3221 and 3223 are, in the configuration represented, engaged in the female centering cones 1111 and 1113, respectively.

The acquisition cables 4201 and 4203 are controlled, via pulleys, by winches 1131 and 1133 of the same kind as the winch 1130 presented in the previous Figures. Each acquisition cable passes through a pair of centering cones to meet the transverse holding structure 3020 to which it is connected by sheaths and pincers.

The winch 1131, the cable 4201, the cones 1111 and 3221, the tube 3001 and the valve-coupler and the outer valve for its connection are in a first plane, and the winch 1133, the cable 4203, the cones 1113 and 3223, the tube 3003 and the valve-coupler and the outer valve for its connection are in a second plane parallel to the first plane. Between these two planes are situated the tube 3002 and the valve-coupler and the outer valve for its connection.

A winch 1200 controlling a safety cable 1210 (not visible) can also be seen. The safety cable 1210 is constantly attached to the lower part of one of the three valve-couplers of the methane tanker (see following paragraph for the structure of the valve-couplers).

Figure 7:
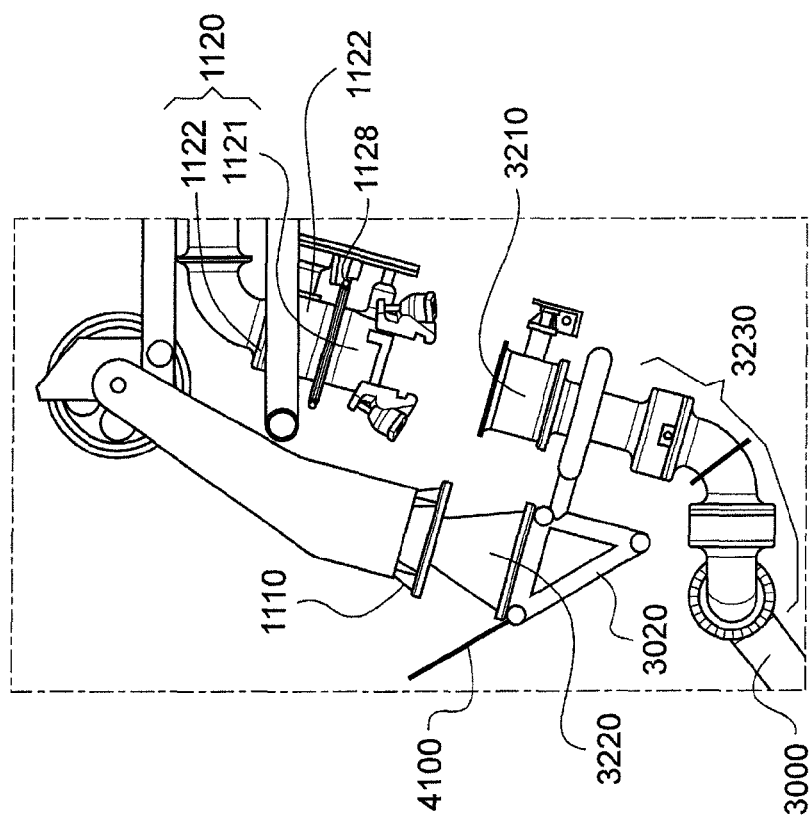
FIGS. 7 and 8 represent the side view of the connection members of the piping of the two ships, in connected and disconnected position, respectively.

As can be seen in FIG. 7, which is a side view in which one of the valve-couplers is referenced 1120, the latter is constituted by a lower valve 1121 and upper valve 1122. The valve-coupler 1120 is furthermore provided with an emergency release system 1128 (ERS for Emergency Release System or PERC for Powered Emergency Release Coupler), by which the lower valve 1121 is detached from the upper valve 1122 in case of emergency disconnection, while remaining connected to the outer valve 3210 of the hinged line. The winch 1200 (FIG. 6) then constitutes a brake for the unwinding of the safety cable 1210 (not visible) which slows the drop of the free end of the distal segment 3200 of the articulated line (scenario described in FIGS. 13 to 16).

The articulated tubes 3001, 3002 and 3003 are held fast to each other overall independently of the cables, in particular by the transverse holding structure 3020. Thus, when there are three articulated tubes, only two acquisition cables 4201 and 4203 are used. Also, it is possible to use only two pairs of guide cones. In the same way, only two outer cables 4100 are used (not shown in FIG. 6) and only two inner cables 4300 are used (not shown in FIGS. 6 to 8). As for the safety cable 1210, this is single and is linked to the valve-coupler placed in central position by a rigid structure in which the three valve-couplers are incorporated.

FIG. 7 shows one of the two articulated tubes 3000 which are positioned facing an acquisition cable and an engagement cone (in FIG. 6, either tube 3001 or tube 3003 is concerned). The tube is linked by the series 3230 of three successive rotations to the outer valve 3210 engaged in the lower valve 1121 of the valve-coupler, parallel to the female cone 1110 engaged with the male centering cone 3220. The outer cable 4100 connected onto a structure adjacent to the male centering cone 3220 and rigidly connected thereto can also be seen. Reference 1125 designates the hydraulic coupling members used in a normal situation of connection and disconnection which contrary to the emergency release system 1128 does not require manual operation for the coupling.

Figure 8:
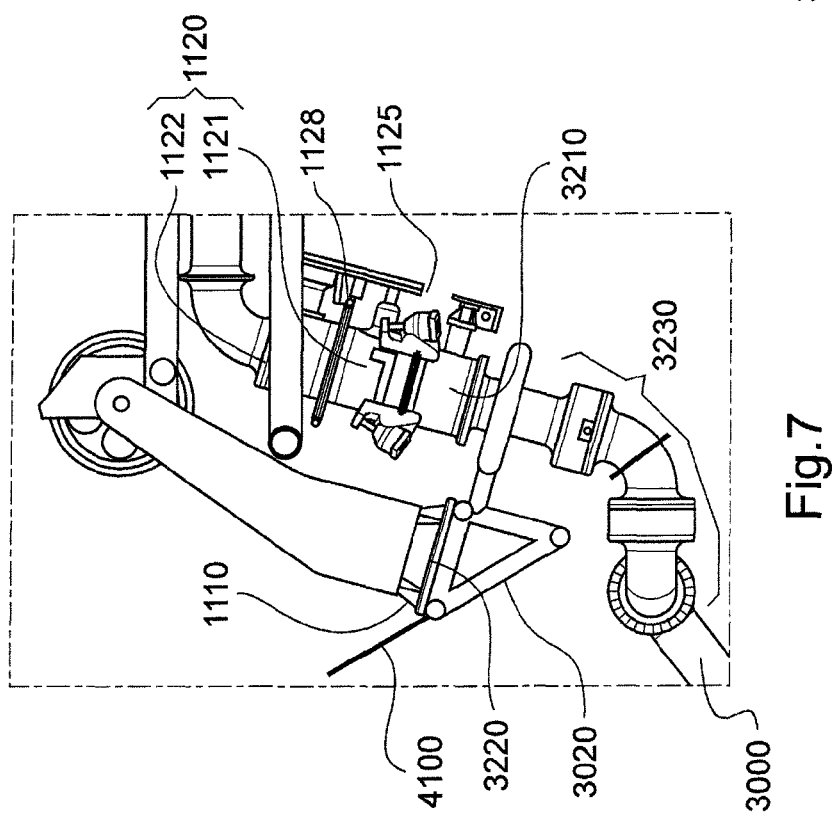

FIG. 8 represents the same structure, the ducts being disconnected. The male centering cone 3220 is more visible than in FIG. 7.

Importantly, as the cable 4100 is fastened, relative to the articulated tube 3000 beyond the series of rotations 3220, the mouth of the outer valve 3210 is directed upwardly in all circumstances.

It is to be noted that in other embodiments, the ducting could be constituted by flexible hoses, and in that case, the series of three rotations 3220 could be absent. The invention then still provides for the cable 4100 to be fastened rigidly to the outer valve 3210, so as to enable the control of the presentation of its mouth upwardly. Rotations may be present above the valve-coupler 1120, that is to say in the methane tanker 1000.

Figure 9:
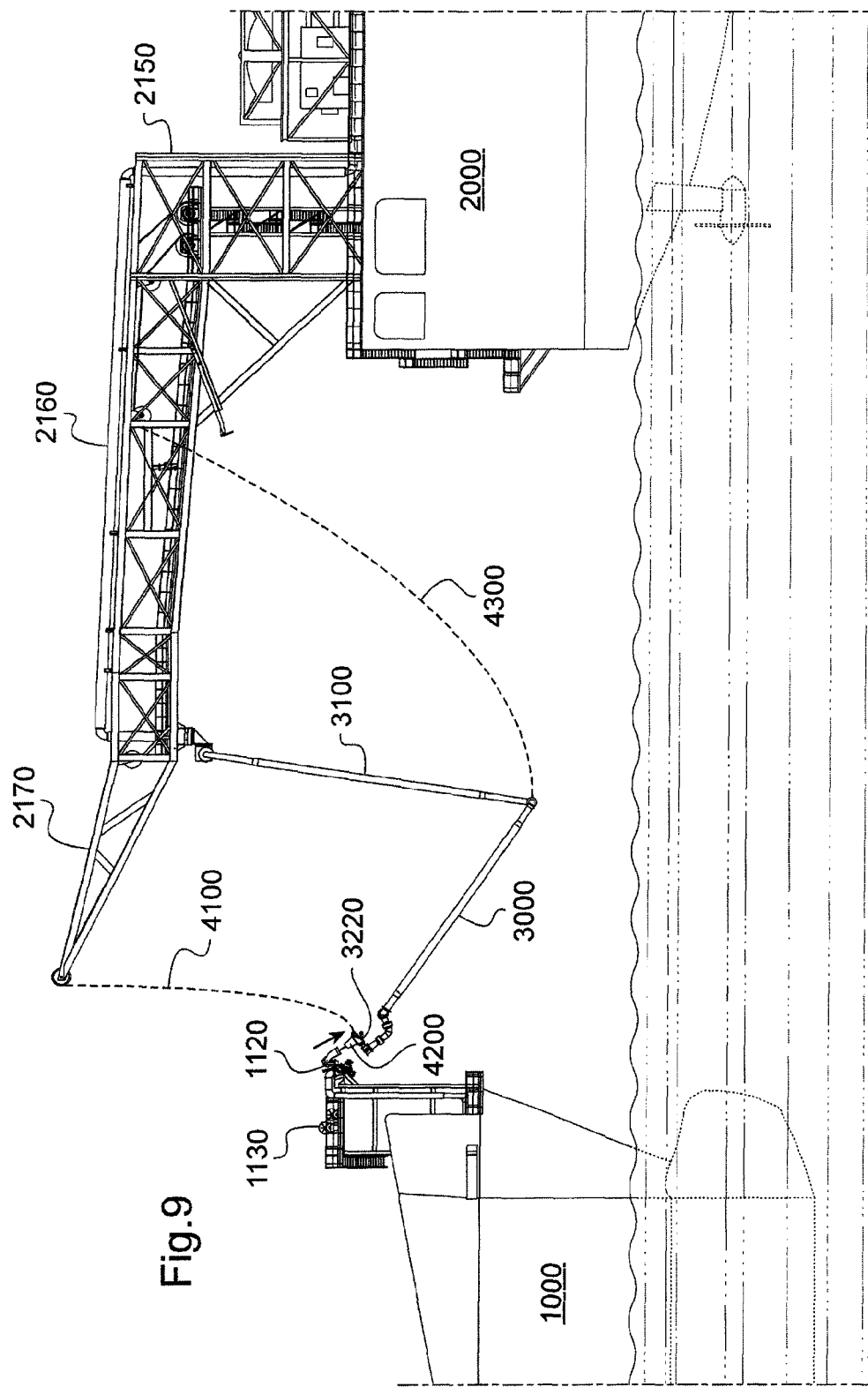
FIGS. 9 to 12 present different successive steps of a procedure for disconnection of the transfer piping of the two ships using a transfer system according to the invention.

Further to the movement for initiating disconnection represented in FIG. 8, starting from the position in FIG. 7, a complete disconnection procedure is implemented, as represented in FIG. 9. The acquisition cables 4200 are first of all re-connected.

Figure 10:
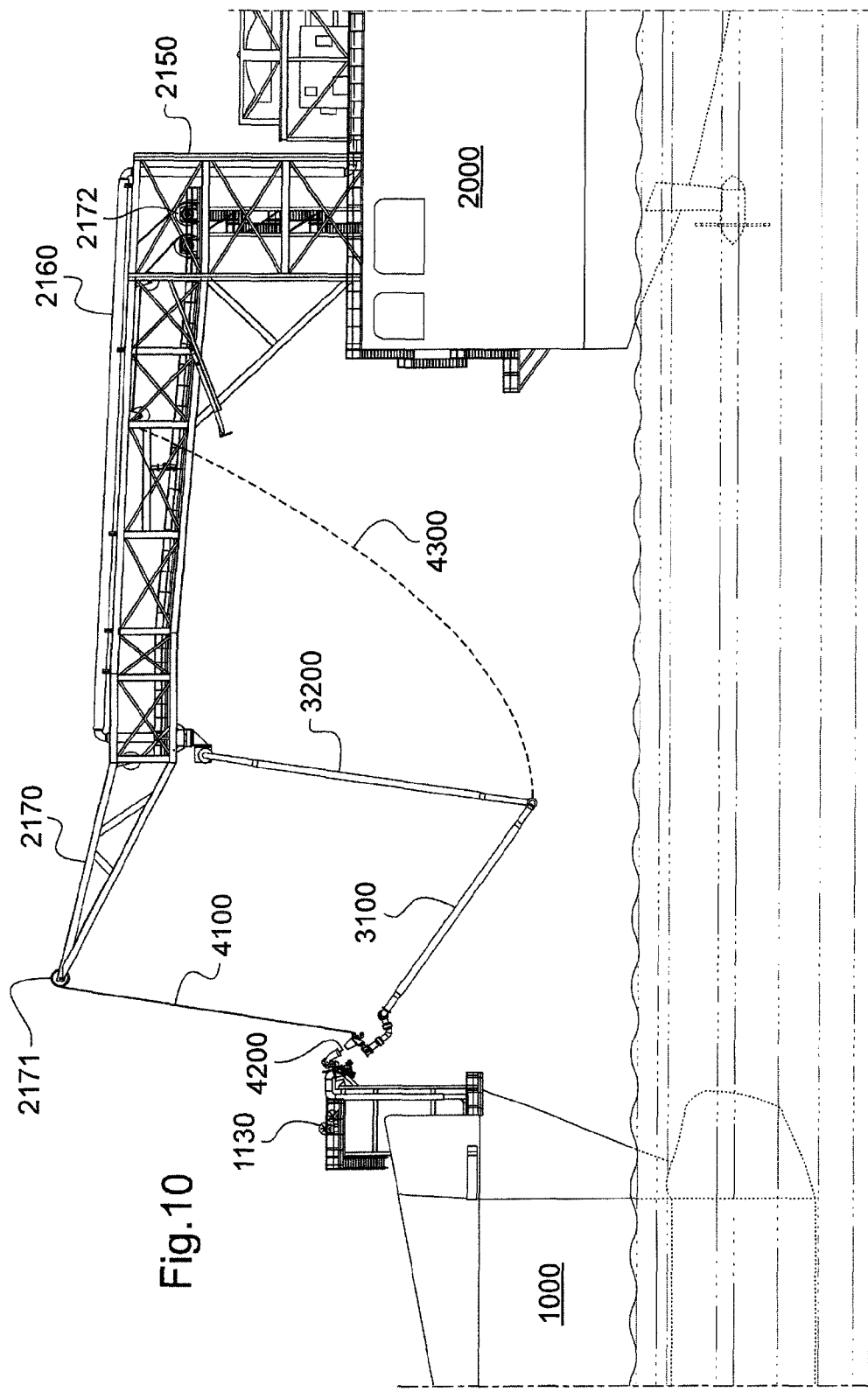

Thus, once the valve-coupler 1120 and the outer valve 3210 have been unlocked from each other, the winch 1130 is activated to unwind the acquisition cable 4200. Such unwinding is carried out at constant speed over a few meters. The outer 4100 and inner 4300 cables are, at this stage, held under minimum constant tension to avoid them going slack. In FIG. 10, the winch 2172 is then locked so as to provide a constant length for the outer cable 4100. The acquisition cable 4200 is unwound at constant speed by the winch 1200 while the inner cable 4300 is held at minimum constant tension.

Figure 11:
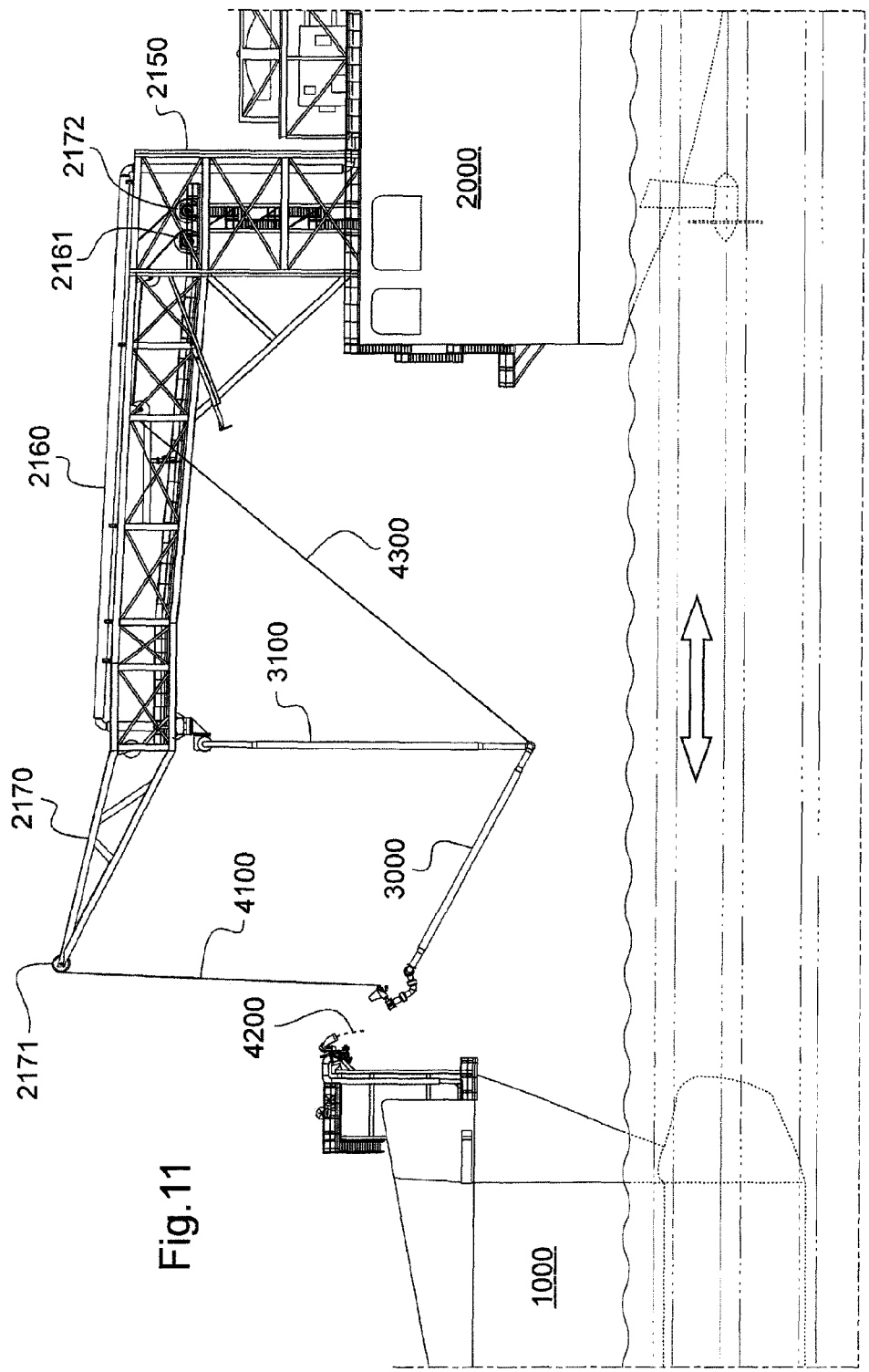

The movement is continued until the articulated tube 3000 attains its position of equilibrium represented in FIG. 11. This equilibrium position is defined by the fact that, in that position, a slackening of the acquisition cable 4200 has no impact on the movement or the position of the articulated tube 3000. The acquisition cable 4200 is then detached from the free end of the articulated tube 3000 and simultaneously or slightly later, the inner cable 4300 starts to be wound by the winch 2161. Also, in the configuration of FIG. 11, the winch 2172 is unlocked and the length of the outer cable 4100 is controlled so as to bring the whole of the articulated tube 3000 towards its parking position.

Figure 12:
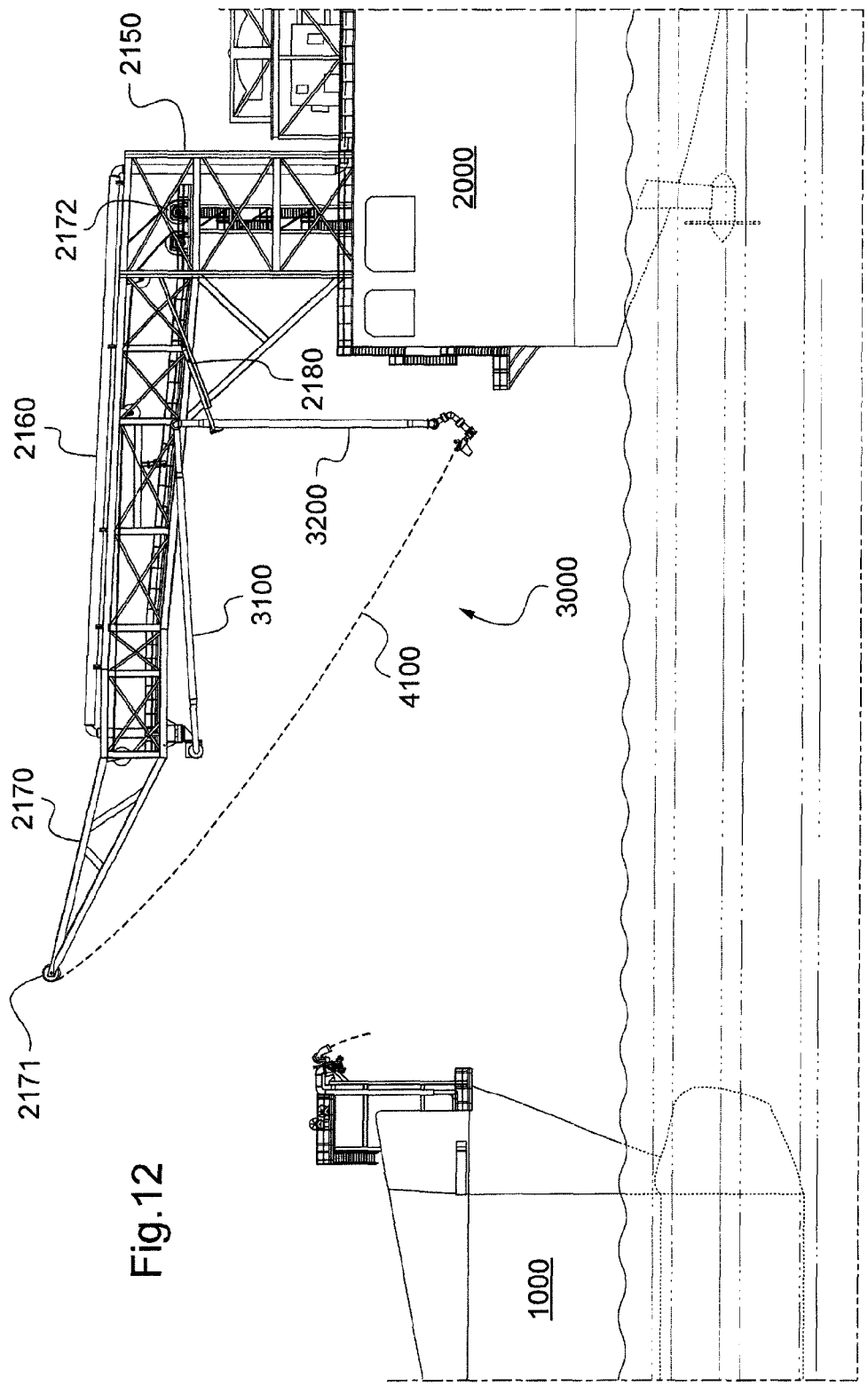

Thus, in FIG. 12, the proximal segment 3100 returns to a practically horizontal position and the distal segment 3200 to a practically vertical position, such that the locking system 2180 is able to act on the distal segment 3200, the inner cable 4300 being reduced to practically zero length and the outer cable 4100 being controlled under minimum constant tension.

Once the articulated tube 3000 has been placed in parking position or resting position, the outer cable is wound in and a simple messenger cable is held between the pulley 2171 and the free end of the articulated tube 3000.

Figure 13:
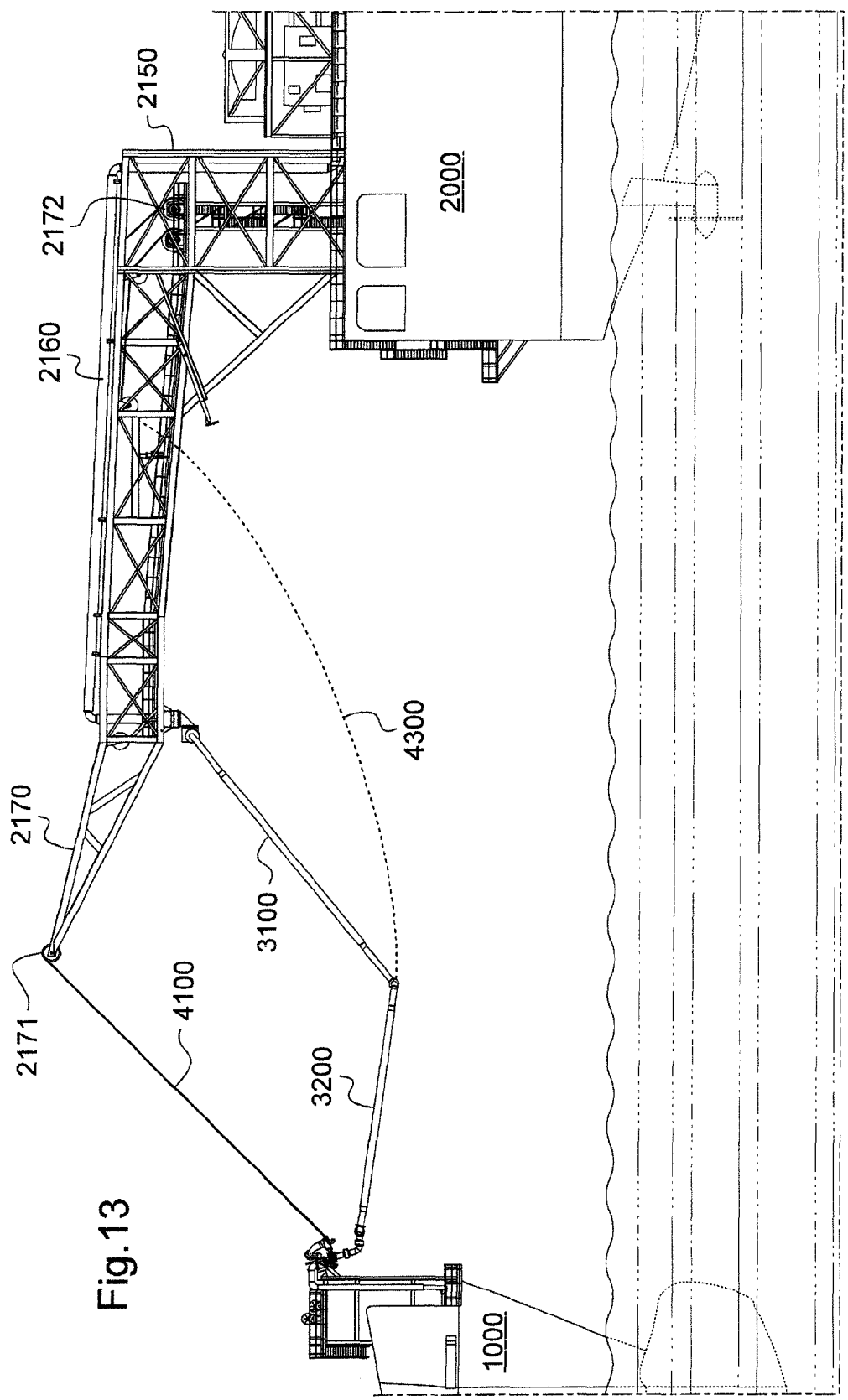

A description will now be made of an emergency disconnection of the ducts of the production ship 2000 and of the ducts of the methane tanker 1000, these latter being connected as was seen with reference to FIGS. 5, 6 and 7. Such an emergency disconnection is launched automatically or manually, for example, when the methane tanker 1000 moves too far away from the production ship 2000 as is represented in FIG. 13.

Figure 14:
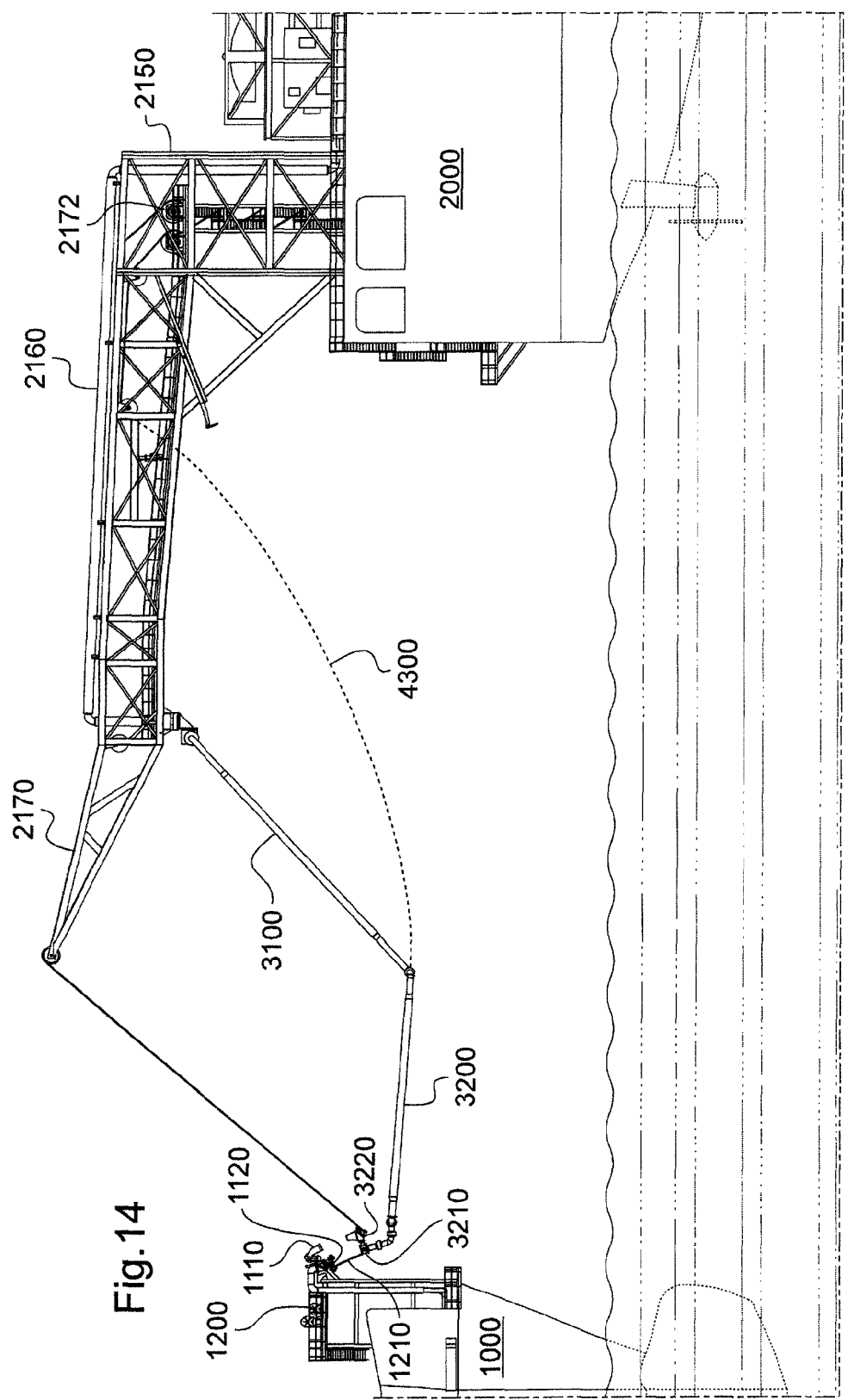

As of the start of a procedure for emergency disconnection, the winch 2172 actuating the outer cable 4100 is locked so as to maintain a constant length in that cable, which ensures that the free end of the distal segment 3200 does not fall into the water. Thus, the length of the outer cable or cables 4100 is fixed by actuating a locking device or brake a few fractions of seconds after the start of an emergency disconnection so as to keep the free end of the distal segment 3200 (called Style 80) out of the water. The inner cable 4300 continues to be kept at a minimum constant tension so as to avoid it slackening. The PERC (Powered Emergency Release Coupler) 1128 is disconnected, the valves 1121 and 1122 (see FIGS. 7 and 8) are thus separated and the cones 1110 and 3220 move apart from each other. The safety cable 1210 unwinds at a maximum speed which may be chosen equal to 3 m/s, as can be seen in FIG. 14, on account of the braking action. It is to be noted that the acquisition cable 4200 (not represented) was disconnected beforehand, as of the end of the initial connection procedure, at the free end of the distal segment 3200.

Figure 15:
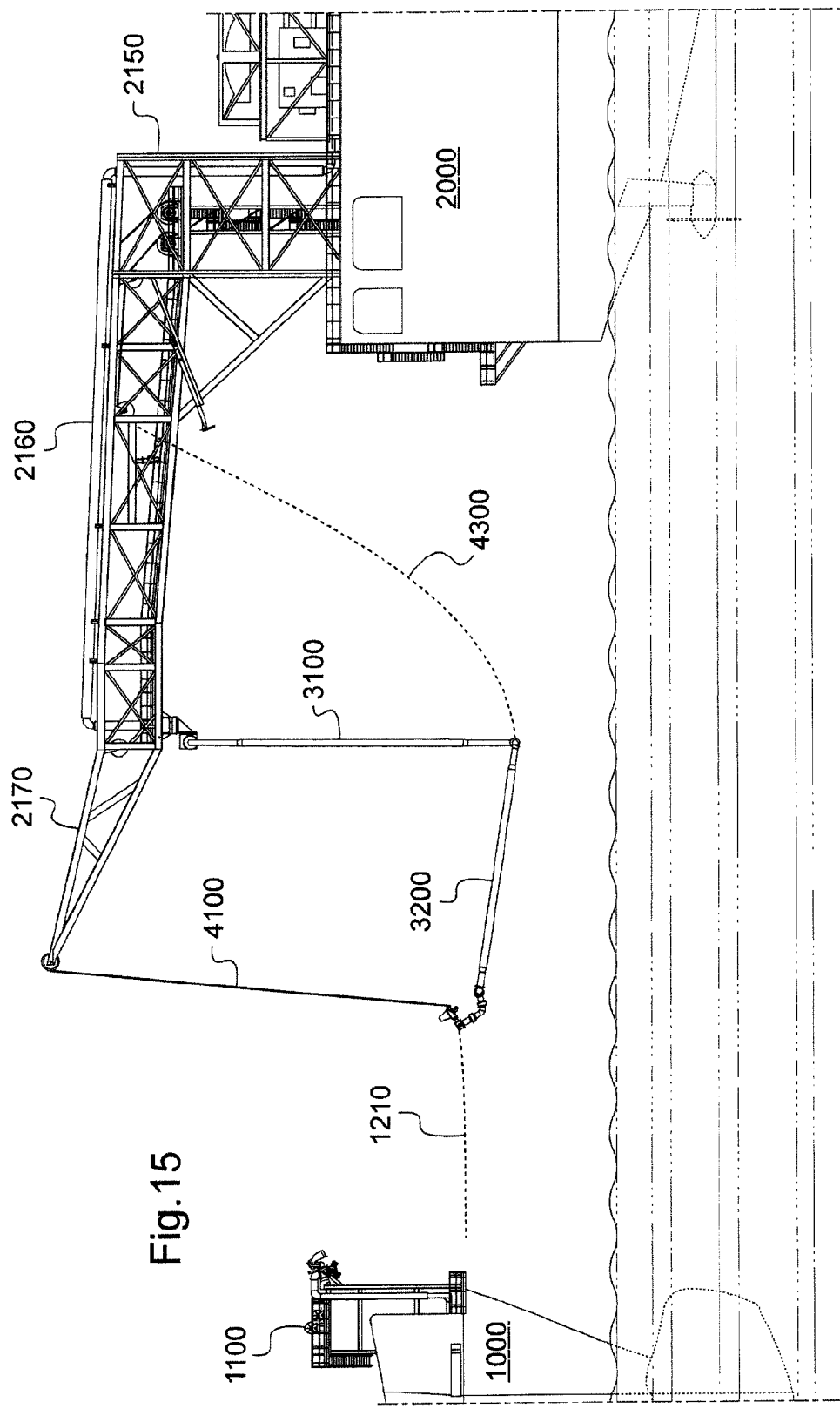

After a few moments, the entire length of the safety cable 1210 is unwound and it detaches by itself from the drum of the winch 1200, as can be seen in FIG. 15. At this stage, the outer cable 4100 returns to a substantially vertical position, the proximal segment 3100 also resuming a substantially vertical position whereas the distal segment 3200 adopts a substantially horizontal disposition.

Under the effect of the movement adopted during the disconnection, the whole of the articulated tube 3000 approaches the production ship 2000 as can be seen in FIG. 16. As the acquired speed was particularly low due to the braking action of the winch 1200, the movement is controlled. A brake is applied to the winch 2161 of the inner cable 4300, then that brake is released. The inner cable 4300 is then subjected to winding at constant speed. The outer cable 4100 is also subjected to unwinding at constant speed. The two cables 4300 and 4100 are maneuvered so as to bring the articulated tube into its parking position, the following part of the maneuver being similar to a conventional disconnection procedure.

The invention is not limited to the disclosed embodiment and covers all the variants within the capability of the person skilled in the art, within the scope of the claims.

The invention claimed is:

1. An offshore fluid transfer system for transferring a fluid product between a first location and a second location, the fluid transfer system comprising:
    a boom which is positioned at the first location, the boom comprising a generally vertical first boom segment and a second boom segment which extends generally horizontally from the first boom segment;
    at least one movable fluid conveying pipe comprising a first pipe end which is anchored to the boom and a second pipe end to which an outer valve is connected, the outer valve being connectable to a valve coupler which is positioned at the second location;
    a first cable which extends to the movable pipe from a first position on the second boom segment, the first cable having a first end which is wound around a first winch and a second end which is connected to the movable pipe proximate the second pipe end, the first cable thereby vertically supporting the second pipe end from the first position independently of the second location; and
    a second cable which extends to the movable pipe from a second position on the second boom segment, the second cable having a first end which is wound around a second winch and a second end which is connected to the movable pipe intermediate the first and second pipe ends, the second cable thereby vertically supporting the movable pipe from the second position;
    wherein the first position is spaced horizontally from the second position in a direction toward the distal end of the second boom segment.

2. An offshore fluid transfer system according to claim 1, wherein the second end of the first cable is connected to an anchorage point which is rigidly connected to the outer valve, and wherein the movable pipe further comprises a set of swivel joints which is connected between the second pipe end and the anchorage point.

3. An offshore fluid transfer system according to claim 1, further comprising a safety device which is configured to maintain a constant unwound length of the first cable in case of an emergency disconnection of the movable pipe from the valve coupler, said safety device comprising one of a locking device or a brake which operates on said first winch.

4. An offshore fluid transfer system according to claim 1, wherein the movable pipe comprises at least two successive articulated arms.

5. An offshore fluid transfer system according to claim 1, wherein the movable pipe comprises at least one flexible pipe.

6. An offshore fluid transfer system according to claim 1, further comprising a centering cone positioned adjacent the outer valve.

7. An offshore fluid transfer system according to claim 1, further comprising:
    at least a second movable fluid conveying pipe having a first pipe end which is anchored to the boom and a second pipe end to which a second outer valve for coupling the second movable pipe to a second valve coupler at the second location is connected; and
    a transverse holding structure which connects the first and second movable pipes together parallel to each other in the vicinity of their respective second pipe ends;
    wherein the second end of the first cable is connected to an anchorage point which is located on the transverse holding structure.

8. An offshore fluid transfer system according to claim 1, wherein the valve coupler comprises a downwardly facing first mouth, the outer valve comprises a second mouth which is configured to connect to the first mouth, and the second end of the first cable is connected to the second pipe end such that the second mouth is directed upwardly.

9. An offshore fluid transfer system according to claim 8, wherein the second end of the first cable is connected to the outer valve.

10. An offshore fluid transfer system according to claim 9, wherein the second end of the first cable is connected to an anchorage point which in turn is rigidly connected to the outer valve.

11. An offshore fluid transfer system according to claim 1, wherein the movable pipe comprises first and second rigid pipe segments which are pivotally connected together, the first pipe segment comprising the first pipe end and the second pipe segment comprising the second pipe end, and wherein the second end of the second cable is connected to the movable pipe proximate the point of connection between the first and second pipe segments.

12. An offshore fluid transfer system according to claim 1, wherein the first position is located proximate the distal end of the second boom segment.

\* \* \* \* \*